(12) United States Patent
Lo

(10) Patent No.: US 10,616,944 B2
(45) Date of Patent: Apr. 7, 2020

(54) COMPUTER SYSTEM AND METHOD THEREOF FOR SHARING OF WIRELESS CONNECTION INFORMATION BETWEEN UEFI FIRMWARE AND OS

(71) Applicant: American Megatrends International, LLC, Norcross, GA (US)

(72) Inventor: Chin-Sung Lo, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 54 days.

(21) Appl. No.: 16/028,737

(22) Filed: Jul. 6, 2018

(65) Prior Publication Data

US 2020/0015296 A1    Jan. 9, 2020

(51) Int. Cl.
*H04W 76/14* (2018.01)
*G06F 9/4401* (2018.01)
*H04W 84/12* (2009.01)

(52) U.S. Cl.
CPC .......... *H04W 76/14* (2018.02); *G06F 9/4406* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,069,962 B1 * | 9/2018 | Yau | B60R 25/01 |
| 10,219,135 B1 * | 2/2019 | Yau | H04B 5/0031 |
| 2010/0299510 A1 * | 11/2010 | Ueltschey | G06F 21/35 713/2 |
| 2013/0031275 A1 * | 1/2013 | Hanes | G06F 3/0231 710/4 |
| 2013/0196590 A1 * | 8/2013 | Fyke | H04W 8/24 455/3.01 |
| 2014/0065963 A1 * | 3/2014 | Hsu | H04W 76/14 455/41.2 |
| 2014/0136828 A1 * | 5/2014 | Lewis | G06F 9/4416 713/2 |
| 2014/0297999 A1 * | 10/2014 | Kim | G06F 9/4401 713/1 |
| 2016/0021485 A1 * | 1/2016 | Sallas | H04W 48/14 455/41.3 |
| 2016/0259650 A1 * | 9/2016 | Lewis | G06F 9/4411 |
| 2016/0294485 A1 * | 10/2016 | Ma | H04W 76/14 |
| 2016/0338120 A1 * | 11/2016 | Boyle | H04L 65/1069 |
| 2017/0091762 A1 * | 3/2017 | Rezayee | G06Q 20/3829 |
| 2017/0202037 A1 * | 7/2017 | Hong | H04W 12/06 |
| 2017/0249160 A1 * | 8/2017 | Lo | H04W 4/80 |
| 2017/0255773 A1 * | 9/2017 | Yu | G06F 21/45 |
| 2017/0289943 A1 * | 10/2017 | Zhao | H04W 60/04 |
| 2018/0006815 A1 * | 1/2018 | Young | G06F 12/1408 |

(Continued)

*Primary Examiner* — Kevin D Mew
(74) *Attorney, Agent, or Firm* — Birch, Stewart, Kolasch & Birch, LLP

(57) ABSTRACT

A computer system includes a memory and computer-readable instructions stored at the memory and executable by a microprocessor to: initiating power on mode in order to execute UEFI firmware for OS boot up procedure; initiating pairing with a wireless device; saving a pairing connection data of the wireless device to memory; retrieving the pairing connection data under Operating System environment; and initiating automatic pairing with the wireless device based on the pairing connection data.

19 Claims, 15 Drawing Sheets

(56) References Cited

U.S. PATENT DOCUMENTS

| | | | |
|---|---|---|---|
| 2018/0070389 A1* | 3/2018 | Morgan | G06F 9/452 |
| 2018/0255593 A1* | 9/2018 | Tsuji | H04W 76/11 |
| 2019/0065300 A1* | 2/2019 | Lo | G06F 11/0766 |
| 2019/0068772 A1* | 2/2019 | Lo | H04M 1/7253 |

\* cited by examiner

| Field | Byte length | Byte offset | Description |
|---|---|---|---|
| Header | | | |
| Signature | 4 | 0 | 'AWCI'. Signature for AMI WiFi Connection Information. |
| Length | 4 | 4 | Length, in bytes, of the entire table |
| Revision | 1 | 8 | This value is 0. |
| Checksum | 1 | 9 | Entire table must sum to zero. |
| OEM ID | 6 | 10 | An OEM-supplied string that identifies the OEM. |
| OEM Table ID | 8 | 16 | An OEM-supplied string that the OEM uses to identify the particular data table. |
| OEM Revision | 4 | 24 | 1 |
| Creator ID | 4 | 28 | Vendor ID of utility that created the table. |
| Creator Revision | 4 | 32 | Revision of utility that created the table. |
| SSID | 32 | 64 | The SSID of the connected WiFi Access Point. |
| Security Type | 4 | 68 | The Security Protocol of the WiFi Access Point.<br>0- Open System<br>1- WPA2 |
| Security Phrase | 64 | 96 | The security phrase |

FIG. 5C

| Offset | Name | Length | Value | Description |
|---|---|---|---|---|
| 0 | Type | BYTE | 68 | AMI WiFi Connection Information Table Indicator. |
| 1 | Length | BYTE | Varies | Length of the structure |
| 2 | Handle | WORD | Varies | Handle or Instance number associated with this structure. |
| 4 | SSID | 32 BYTES | Varies | The SSID of the connected WiFi Access Point. |
| | Security Type | DWORD | Varies | The Security Protocol of the WiFi Access Point.<br>2- Open System<br>3- WPA2 |
| | Security Phrase | 64 BYTES | Varies | The security phrase |

FIG. 6C

| Variable Name | Attribute | Description |
|---|---|---|
| AMI_WIFI_INFO | NV, BS, RT | This variable contains the connected WiFi Access Point Information, include SSID, Security Type and Security Phrase. |

FIG. 7C

| Offset | Name | Length | Description |
|---|---|---|---|
| 0 | SSID | 32 Bytes | The SSID of the connected WiFi Access Point. |
| 32 | Security Type | 4 Bytes | The Security Protocol of the WiFi Access Point.<br>4- Open System<br>5- WPA2 |
| 36 | Security Phrase | 64 Bytes | The security phrase |

FIG. 7D

COMPUTER SYSTEM AND METHOD THEREOF FOR SHARING OF WIRELESS CONNECTION INFORMATION BETWEEN UEFI FIRMWARE AND OS

BACKGROUND

1. Technical Field

The present disclosure generally relates to a computer system and method thereof for Wireless data exchange between a UEFI firmware and an Operating System; particularly, the present disclosure relates to a computer system and method thereof for sharing of Wireless device connection information between a UEFI firmware and an Operating System.

2. Description of the Related Art

Traditionally, computer systems may boot to an operating system. The boot up of the operating system is typically handled by a low level instruction code that is used as an intermediary between the hardware components of the computer system and the operating software and other high level software executing on the computer system. This low level instruction code is often known as the Basic Input/Output System ("BIOS") firmware and provides a set of software routines that allow high level software to interact with the hardware components of the computing system. The firmware performs routines for conducting Power-On Self Test ("POST") each time the computing system is powered on in order to test and initiate all hardware components in the computing system before handing off control to the operating system. These hardware components may include the system main memory, disk drives, and keyboards.

However, as technology has progressed with many devices such as peripheral devices advancing towards being wireless or cordless, boot up firmwares based on the traditional BIOS standard, which was originally designed for personal computers of International Business Machine Corporation (IBM), have become a point of restriction or limitation as to what the boot up firmware may control with respect to hardware and subsequently what hardware the Operating System may control. As new hardware and software technologies were being developed, this source of restriction became a major obstacle in the hardware-software interaction. As a result, a new standard of BIOS firmware has been proposed and widely adopted by many major industry leaders. This new standard is called the Unified Extensible Firmware Interface (UEFI).

With the adoption of UEFI standards, BIOS companies were able to produce UEFI firmware for computer systems, while companies producing Operating Systems were able to take advantage of the services these UEFI firmware provided by producing UEFI compliant Operating Systems.

However, separate development between the UEFI firmware and the Operating System have resulted in an information disconnect between the UEFI firmware and the Operating System with respect to I/O related hardware setup. With regards to I/O hardware setup, modern UEFI firmware generally still follow the old BIOS in that only I/O input devices such as wired keyboard or mouse can be easily setup for use during the pre-OS phase when the UEFI firmware has control. Generally, wireless devices are unable to connect to the computer system when the UEFI firmware is being executed unless if the wireless device is physically connected to the computer system via an adapter. In other circumstances, even if the wireless device can be installed or paired with the computer system during the execution of the UEFI firmware in the pre-OS environment, this pairing information is lost once the UEFI firmware hands over control of the computer system to the Operating System. Users would need to manually install OS drivers for the wireless device in order to get the wireless device to work under the Operating System environment. Conversely, if a wireless device was first paired to the computer system in the Operating System, this pairing information is lost once the computer system is rebooted into the pre-OS environment of the UEFI firmware. Once again, the wireless device would need to be manually and physically paired to the computer system under the UEFI firmware environment in order for the wireless device to work. There is need for a more modern approach that allows wireless information to be shared across the UEFI firmware and the Operating System in order to allow wireless devices to be more integrated with the computer system.

SUMMARY

It is an objective of the present disclosure to provide a computer system and a method thereof for wireless connection data to be shared between an UEFI firmware and an Operating System executed on the computer system.

It is another objective of the present disclosure to provide a computer system and a method thereof for increasing the ease and speed of pairing a wireless device to the computer system as the computer system transitions between an UEFI firmware and an Operating System.

According to one aspect of the invention, a computer system includes a memory and computer-readable instructions stored at the memory and executable by a microprocessor to: initiating power on mode in order to execute UEFI firmware for OS boot up procedure; initiating pairing with a wireless device; saving a pairing connection data of the wireless device to memory; retrieving the pairing connection data under Operating System environment; and initiating automatic pairing with the wireless device based on the pairing connection data.

According to another aspect of the invention, a computer system includes a memory and computer-readable instructions stored at the memory and executable by a microprocessor to: initiating, under an Operating System environment, a wireless pairing process to a wireless device; saving a pairing connection data of the wireless device to memory; retrieving, by an UEFI firmware, the pairing connection data under an UEFI pre-OS (pre Operating System) environment; and initiating, by the UEFI firmware, automatic pairing with the wireless device based on the pairing connection data.

According to another aspect of the invention, a computer implemented method includes: initiating power on mode in order to execute UEFI firmware for OS boot up procedure; initiating pairing with a wireless device; saving a pairing connection data of the wireless device to memory; retrieving the pairing connection data under Operating System environment; and initiating automatic pairing with the wireless device based on the pairing connection data.

According to yet another aspect of the invention, a computer implemented method includes: initiating, under an Operating System environment, a wireless pairing process to a wireless device; saving a pairing connection data of the wireless device to memory; retrieving, by an UEFI firmware, the pairing connection data under an UEFI pre-OS (pre Operating System) environment; and initiating, by the UEFI firmware, automatic pairing with the wireless device based on the pairing connection data

BRIEF DESCRIPTION OF THE DRAWINGS

FIG. 5C is an embodiment of the ACPI table of the pairing connection data;

FIG. 6C is an embodiment of the SMBIOS table of the pairing connection data;

FIG. 7C is an embodiment of the format of the UEFI variable of FIG. 7A;

FIG. 7D is another embodiment of the format of the UEFI variable of FIG. 7C;

DETAILED DESCRIPTION OF THE PREFERRED EMBODIMENT

Embodiments of the present invention provide methods and systems having an interface between an UEFI firmware and an Operating System for exchanging or sharing of wireless connection information.

In the following detailed description, references are made to the accompanying drawings that form a part hereof, and in which are shown by way of illustration specific embodiments or examples. These embodiments are only illustrative of the scope of the present invention, and should not be construed as a restriction on the present invention. Referring now the drawings, in which like numerals represent like elements through the several figures, aspects of the present invention and the exemplary operating environment will be described.

The present disclosure provides a computer system and method thereof for sharing wireless connection information or data between an UEFI firmware and an Operating System on the computer system. Preferably, the computer system includes (but not limited to) laptop computers, personal computers, computer servers, handheld computer devices such as mobile smart phones, tablet computers, and wearable computing devices.

Figure 1:
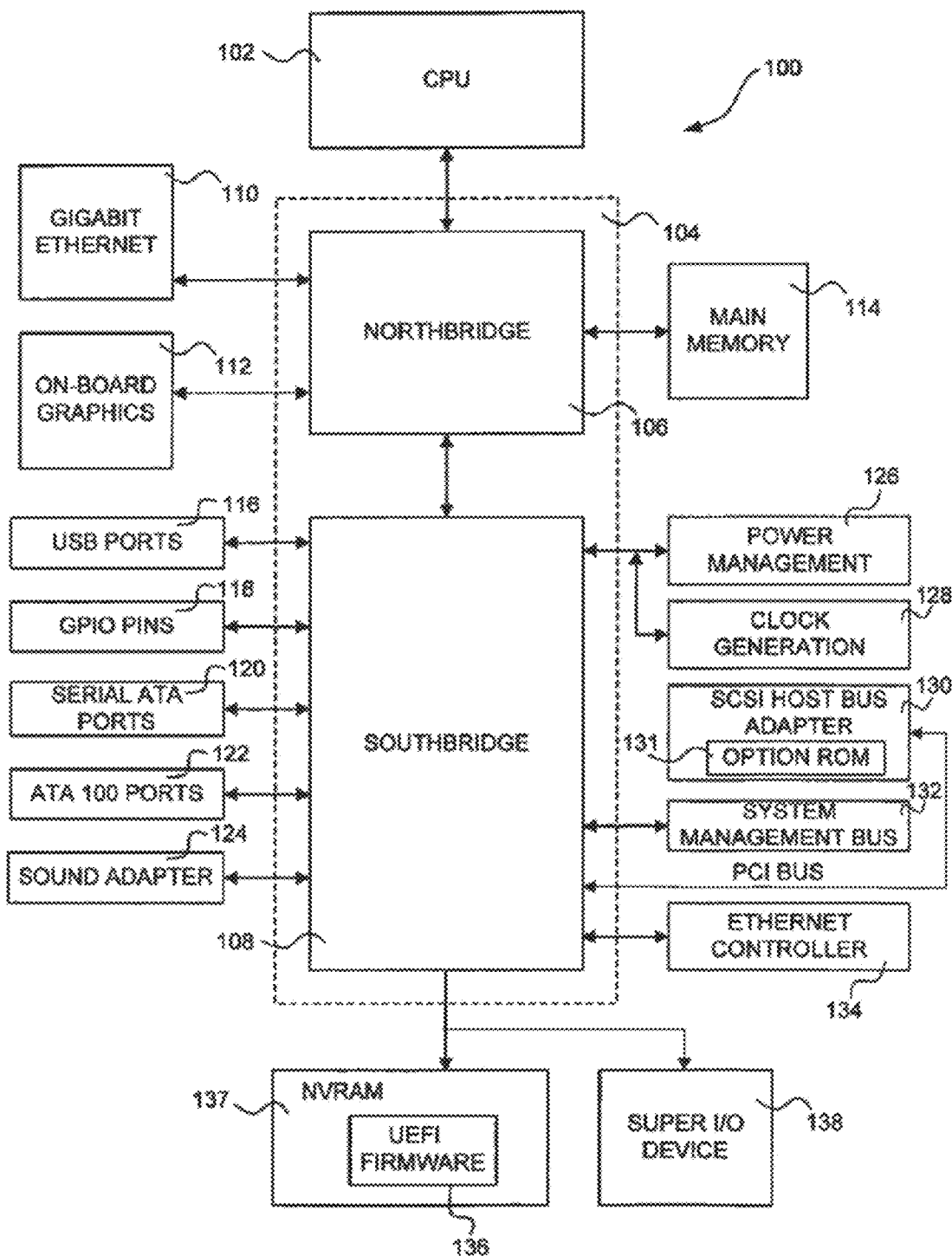
FIG. 1 is a view of an embodiment of a computer system of the present invention.

FIG. 1 and the following discussion are intended to provide a brief, general description of a suitable computing environment in which the invention may be implemented. However, those skilled in the art will recognize that the invention may also be implemented in other suitable computing environments.

Referring to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer system 100 that is operative to initiate an operating system boot from firmware. The blocks of FIG. 1 are intended to represent functional components of the computer architecture and are not intended to necessarily represent individual physical components. Functional components described may be combined, separated, or removed without departing from the overall sense and purpose of the computer architecture.

In order to provide the functionality described herein, the computer system 100 includes a baseboard, or "motherboard", which is a printed circuit board to which a multitude of components or devices may be connected by way of a system bus or other communication path. In one illustrative embodiment, a central processing unit (CPU) 102 operates in conjunction with a chipset 104. The CPU 102 may be a standard central processor that performs arithmetic and logical operations necessary for the operation of the computer. The CPU 102, in this and other embodiments, may include one or more of a microprocessor, a microcontroller, a field programmable gate array (FPGA), a complex programmable logic device (CPLD), an application specific integrated circuit (ASIC), and/or any other electronic computing device.

The chipset 104 includes a northbridge 106 and a southbridge 108. The northbridge 106 provides an interface between the CPU 102 and the remainder of the computer system 100. The northbridge 106 also provides an interface to one or more random access memories (RAM) used as a main memory 114 in the computer system 100 and, possibly, to an on-board graphics adapter 112. The northbridge 106 may also enable networking functionality through a gigabit Ethernet adapter 110. The gigabit Ethernet adapter 110 is capable of connecting the computer system 100 to one or more other computers via a network. Connections that may be made by the adapter 110 may include local area network (LAN) or wide area network (WAN) connections, for example. LAN and WAN networking environments are commonplace in offices, enterprise-wide computer networks, intranets, and on the Internet. The northbridge 106 is connected to the southbridge 108.

The southbridge 108 is responsible for controlling many of the input/output functions of the computer system 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot specification (BBS) compliant SCSI host bus adapter 130. In one embodiment, the bus comprises a peripheral component interconnect (PCI) bus. The southbridge 108 may also provide a system management bus 132 for use in managing the various components of computer system 100. Power management circuitry 126 and clock generation circuitry 128 may also be utilized during operation of the southbridge 108.

The southbridge 108 is also operative to provide one or more interfaces for connecting mass storage devices to the computer system 100. For instance, according to an embodiment, the southbridge 108 includes a serial advanced technology attachment (SATA) adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system, application programs, and other data. As known to those skilled in the art, an operating system comprises a set of programs that control operations of a computer and allocation of resources. An application program is software that runs on top of the operating system software, or other runtime environment, and uses computer resources to perform application specific tasks desired by a user of the computer system 100.

The mass storage devices connected to the southbridge 108 and the SCSI host bus adapter 130, and their associated computer-readable media, provide non-volatile storage for the computer system 100. Although the description of computer-readable media contained herein refers to a mass storage device, such as a hard disk or CD-ROM drive, it should be appreciated by those skilled in the art that computer-readable media can be any available media that can be accessed by the computer system 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface or another interface may be utilized to connect a computer storage medium such as a ROM or a non-volatile random access memory (NVRAM) 137 such as a flash memory. The computer storage medium may be used for storing the firmware 136 that includes modules containing instructions and data that help to startup the computer system 100 and to transfer information between elements within the computer system 100. However, in other different embodiments, the firmware 136 may be stored in any other areas in the computer system 100.

The firmware 136 may include program code that is compatible with the UEFI specification. It should be appreciated that in addition to the firmware 136 including an UEFI-compatible firmware, other types and combinations of firmware may be included. For instance, the firmware 136 may include additionally or alternatively a BIOS firmware and/or other type of firmware known to those in the art. Additional details regarding the operation of the UEFI firmware 136 are provided below with respect to the subsequent diagrams. It should be appreciated that the computer system 100 may not include all of the components shown in FIG. 1, may include other components that are not explicitly shown in FIG. 1, or may utilize an architecture completely different than that shown in FIG. 1.

Figure 2:
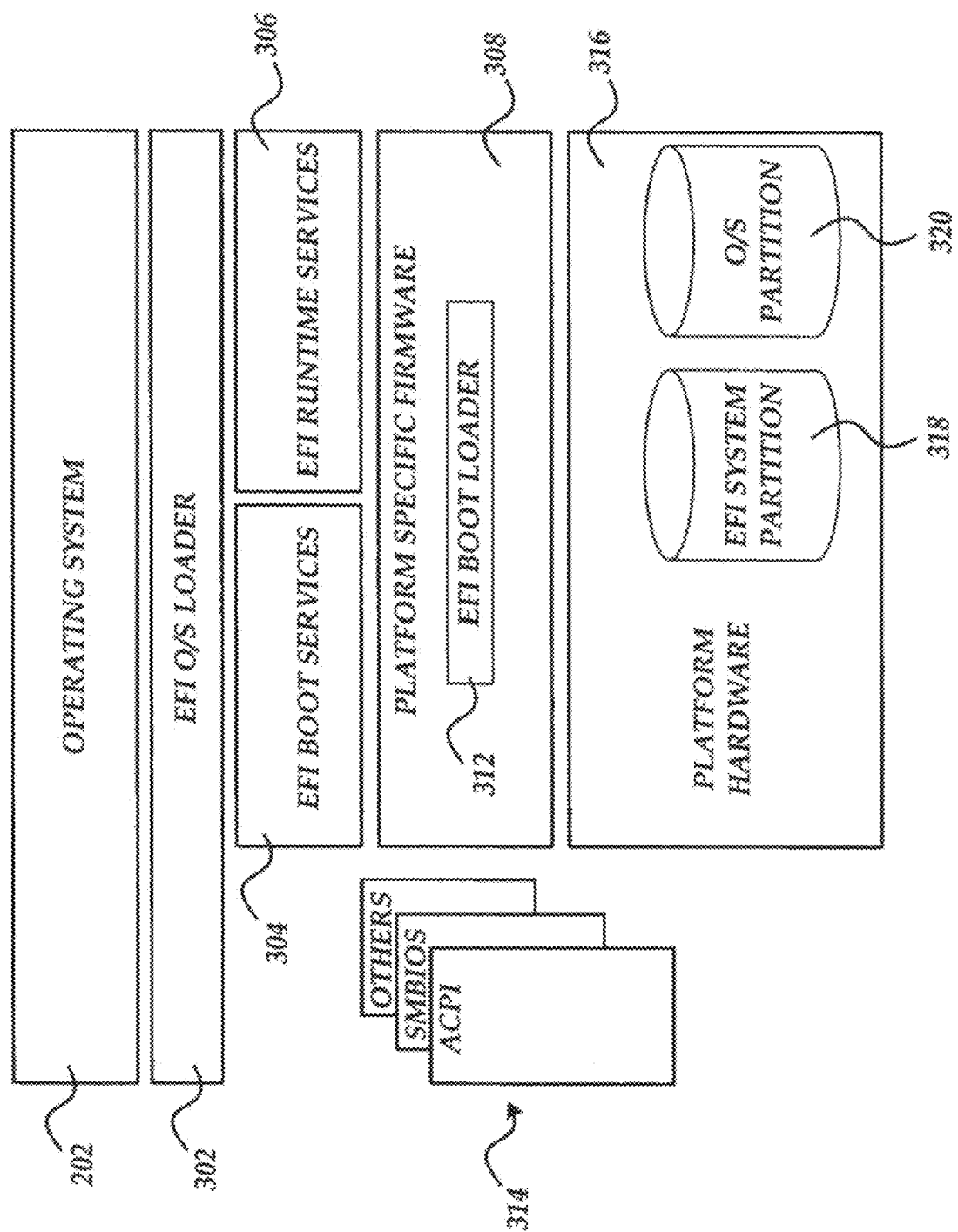
FIG. 2 is a view of an UEFI specification-compliant system.

Referring to FIG. 2, additional details regarding an UEFI specification-compliant system that may be utilized to provide an operating environment for the various implementations presented herein will be described. As shown in FIG. 2, the system includes a platform hardware 316 and an operating system (OS) 202. A platform firmware 308 may retrieve OS program code from the EFI system partition 318 using an OS loader 302, sometimes referred to as a boot loader or an OS boot loader. Likewise, the OS loader 302 may retrieve OS program code from other locations, including from attached peripherals or from the firmware 136 itself. The EFI system partition 318 may be an architecturally shareable system partition. As such, the EFI system partition 318 defines a partition and file system that are designed to allow safe sharing of mass storage between multiple vendors. An OS partition 320 may also be utilized.

EFI boot services 304 provide interfaces for devices and system functionality that can be used during boot time. EFI runtime services 306 are available to the OS loader 302 during the boot phase and to the operating system 202 when it is running. For example, runtime services may be presented to ensure appropriate abstraction of base platform hardware resources that may be needed by the operating system 202 during its normal operation. EFI allows extension of platform firmware by loading EFI drivers and EFI application images which, when loaded, have access to all EFI-defined runtime and boot services. Once the EFI firmware is initialized, it passes control to the boot loader 312.

Figure 3:
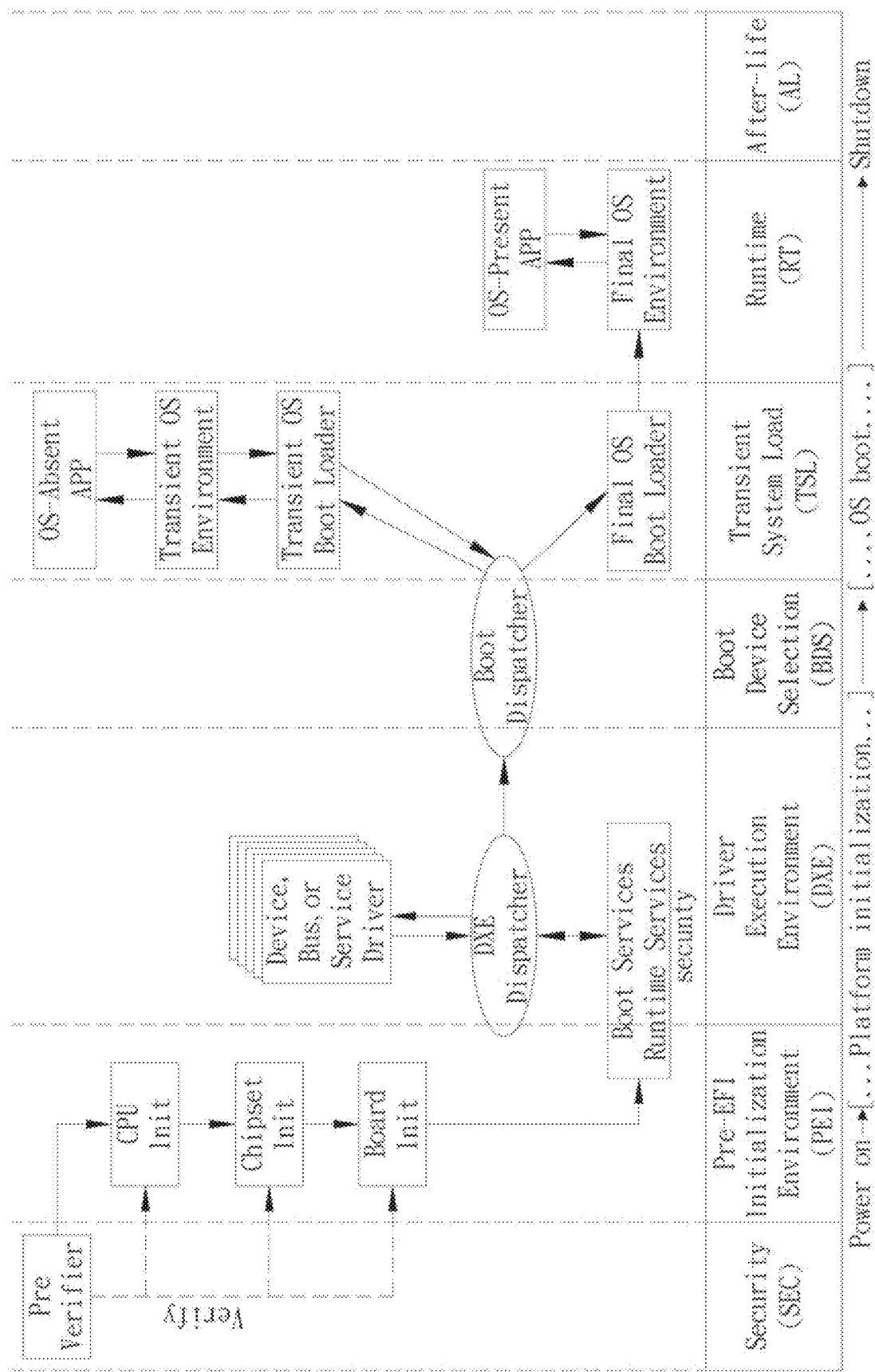
FIG. 3 is a view of the different phases during execution of an UEFI firmware.

Referring to FIG. 3, details are shown to illustrate the different phases or stages the UEFI firmware progresses through towards boot up of an Operating System. As shown in FIG. 3, when the computer system 100 is powered on, the UEFI firmware of the present invention is executed by the processor of the computer system 100. The UEFI firmware will first enter a Security (SEC) phase, wherein no memory has yet been initialized in the computer system 100. In the present phase, since no memory has yet been initialized, the processor's cache is used as a Random Access Memory (RAM) to pre-verify the central processing unit (CPU), the chipset, and the main board. Next, the UEFI firmware enters the Pre-EFI Initialization (PEI) phase, wherein the CPU, the chipset, the main board, and the memory of the computer system 100 are initialized. In the Driver Execution (DXE) phase, boot services, runtime services, and driver execution dispatcher services may be executed to initialize any other hardware in the computer system 100. Following the DXE phase, the UEFI firmware enters into the Boot Device Selection (BDS) phase. In the BDS phase, attempts are made to initialize console devices as well as various drivers corresponding to the boot loader for the Operating System. In the Transient System Load (TSL) phase, control is handed off to the Operating System to continue the start up of the computer system 100 before reaching the Runtime (RT) phase of normal operation of the computer system 100.

Figure 4A:
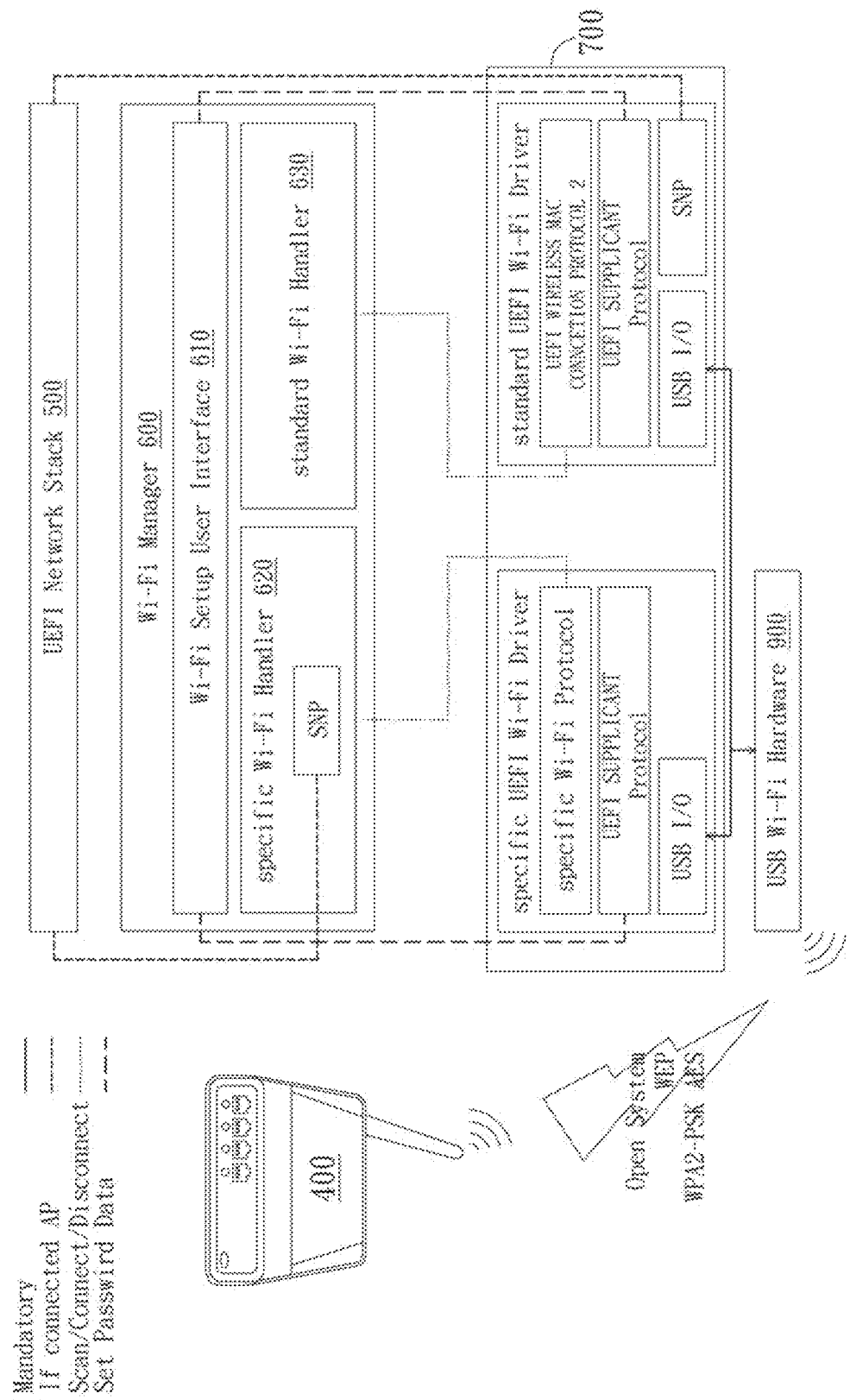
FIG. 4A is an embodiment of the present invention.

FIG. 4A illustrates an aspect of the embodiment of the present invention. FIG. 4 represents an abstraction of the computer system 100 of the present invention. In the present embodiment, a WiFi manager process 600 can initiate and connect with a WiFi driver 700, wherein the WiFi driver 700 is connected with a WiFi hardware component 900. In one embodiment, the WiFi driver 700 is a UEFI-based WiFi driver, but the present disclosure is not limited in this regard. In this embodiment, the WiFi driver 700 includes a standard UEFI WiFi driver, and a specific UEFI WiFi driver which may be designed by a supplier and includes specific functions. The WiFi hardware component 900 is used to signally connect with a wireless device 400 (e.g., a WiFi device). In one embodiment, the WiFi manager process 600 is a UEFI-based process, but the present disclosure is not limited in this regard. It should be noted that, in the description herein, WiFi technique, including WiFi device 400, WiFi manager process 600, WiFi driver 700, and WiFi hardware component 900, is taken as an illustrative example, but another wireless communication technique are within the contemplated scope of the present disclosure.

Figure 4B:
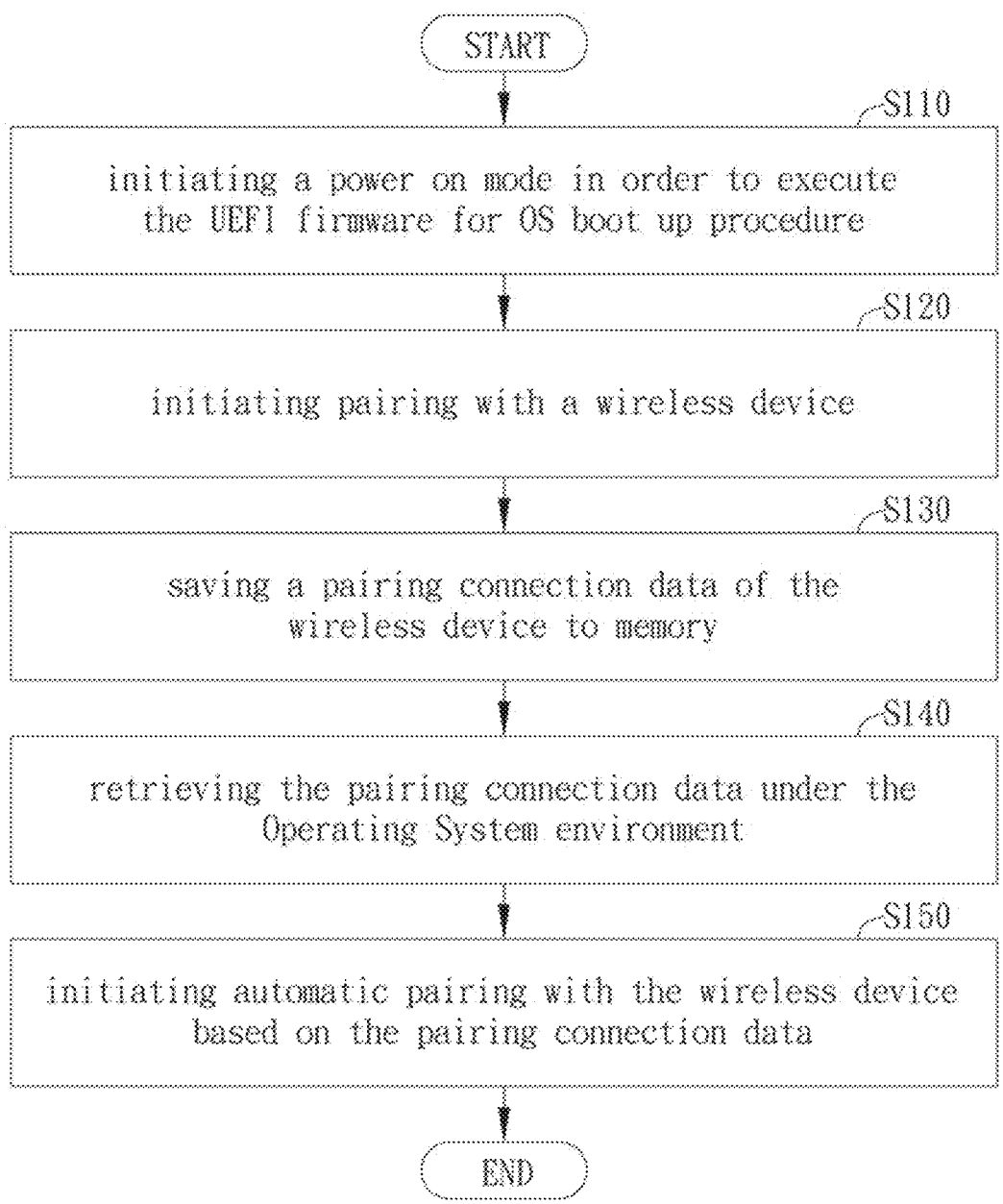
FIG. 4B is an embodiment of the method of sharing wireless connection information.
Figure 5A:
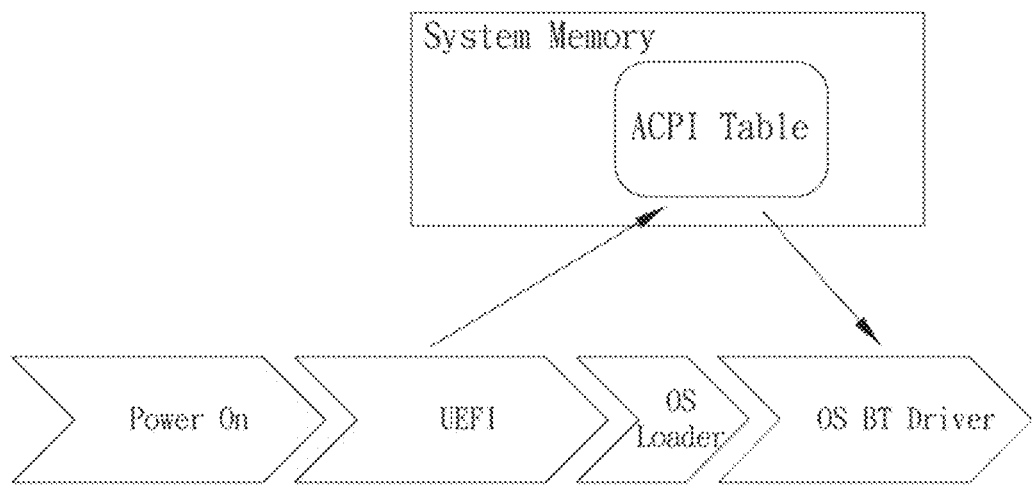
FIG. 5A is an embodiment of storing pairing connection data in the form of an ACPI table.

FIG. 4B is an embodiment of sharing wireless connection information when transitioning from pre-OS environment to the OS environment. As shown in FIG. 5A, in the present embodiment, the pairing connection data retrieved and generated during the pre-OS environment by the UEFI firmware may be stored into memory as an ACPI table. After the UEFI firmware hands off control of the computer system 100 to the Operating System, the pairing connection data may be retrieved from the ACPI table in memory, wherein the pairing connection data can be used to automatically connect and pair with the wireless device corresponding to the pairing connection data.

As shown in FIG. 4B, FIG. 4B is an embodiment of a method for the sharing of wireless connection data when transitioning from a pre-OS environment to an OS environment of FIG. 4A, wherein the method includes steps S110 to S150.

Step S110 includes initiating a power on mode in order to execute the UEFI firmware for OS boot up procedure. In the present embodiment, the power on mode refers to the computer system 100 being powered on and booted to the UEFI firmware. However, in other different embodiments, the power on mode can also mean the computer system 100 is reset to executing the UEFI firmware.

During the initiation of the power on mode, the computer system 100 will first run through the security (SEC) and Pre-EFI initialization environment (PEI) phases to first verify and initiate the central processing unit, the chipset, and the motherboard of the computer system 100. As the UEFI firmware continues to be executed, the next phase of driver execution environment (DXE) will be reached.

Step S120 includes initiating pairing with a wireless device. In the embodiment shown in FIG. 4A, the UEFI firmware executing on the computer system 100 will initiate pairing with the wireless device 400 via a WiFi hardware component 900.

In the present embodiment, the wireless device 400 may be a WiFi compliant device and may be interfaced wirelessly through the IEEE (Institute of Electrical and Electronics Engineers) 802.11 standards. The IEEE 802.11 is a set of media access control (MAC) and physical layer (PHY) specification for implementing wireless local area network (WLAN) computer communication in the 900 MHz and 2.4, 3.6, 5, and 60 GHz frequency bands. However, it should be noted that the communication between the computer system 100 of the present invention and the wireless device 400 is not restricted or limited to the IEEE 802.11 standard. In other different embodiments, the computer system 100 and the wireless device 400 may communicate via WiFi ad hoc, WiFi direct methods, or even other non-WiFi but wireless methods.

In the present embodiment, the WiFi hardware component 900 may be a wireless network hardware that is physically connected to the computer system 100, such as a wireless network interface controller (wireless NIC). Examples of wireless NICs may include, but not limited to, wireless WiFi USB adapters, Bluetooth interface cards, PCI express WiFi cards, and any other related wireless network interface controllers.

Step S130 includes saving a pairing connection data of the wireless device to memory. In the present embodiment, after pairing between the computer system 100 and the wireless device 400 has been successfully completed, the UEFI firmware will save the wireless connection information regarding the pairing between the computer system 100 and the wireless device 400 to memory via the WiFi manager process 600. In the present embodiment, the wireless connection information retrieved and saved into the pairing connection data may include the MAC address, manufacturer name, type, and other related information pertaining to the wireless device 400 and any communication protocol information required for the pairing between the wireless device 400 to the computer system 100.

Step S140 includes retrieving the pairing connection data under the Operating System environment. In the present embodiment, after the UEFI firmware has handed control of the computer system 100 to the Operating System 202, the pairing connection data can be retrieved from the memory.

Step S150 includes initiating automatic pairing with the wireless device 400 based on the pairing connection data. In the present embodiment, the wireless connection information extracted from the pairing connection data can be subsequently used to automatically connect and pair the wireless device 400 to the computer system 100 under the Operating System environment. For instance, as illustrated in FIG. 4A, the pairing connection data may be stored in memory as an UEFI network stack 500 which can then be retrieved by a specific WiFi Handler unit 620 of the WiFi manager 600 to drive automatic pairing to the wireless device 400 via the WiFi hardware component 900.

FIG. 5A is an embodiment of the direction of sharing of the pairing connection data from the UEFI firmware in the pre-OS environment to an OS driver in the Operating System 202 environment. In the present embodiment, the pairing connection data is saved in the UEFI network stack in the form of an ACPI table, wherein the OS driver in the Operating System environment can then retrieve the ACPI table from the memory.

Figure 5B:
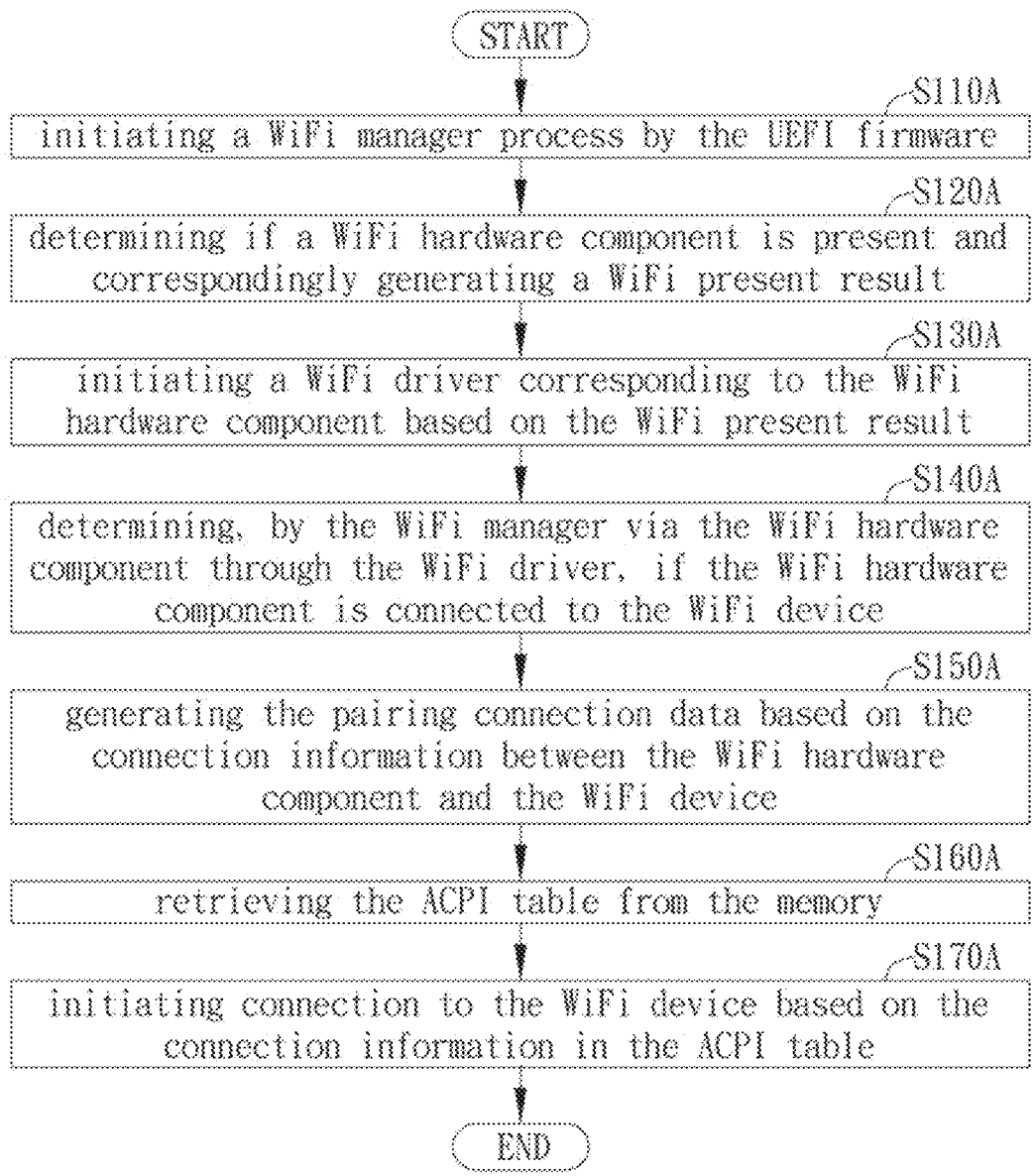
FIG. 5B is an embodiment of the method of sharing the ACPI table of FIG. 5A.

FIG. 5B is an embodiment of the flowchart for the method of sharing the pairing connection data via the ACPI table of FIG. 5A. As shown in FIG. 5B, the method includes steps S110A to S170A, wherein these steps will be explained in further detail with FIGS. 4A and 5B.

Step S110A includes initiating the WiFi manager process 600 by the UEFI firmware. In the present embodiment, when the computer system 100 is powered on and booted to the UEFI firmware in the pre-OS environment, the UEFI firmware will initiate and install drivers for detected hardware devices during the DXE phase. In the case of the present invention, any wireless devices 400 that are physically connected to the computer system 100 will be detected and the computer system 100 will try to install corresponding drivers for them.

However, wireless devices 400 may typically not be physically connected to the computer system 100. In this case, step S120A will be executed, wherein Step S120A includes determining if a WiFi hardware component is present and correspondingly generating a WiFi present result. In the present embodiment, the WiFi manager process 600 will scan and detect during the DXE phase whether the computer system 100 is physically connected with a WiFi hardware component 900. As mentioned previously, this WiFi hardware component 900 can be any wireless network interface controller, such as a WiFi wireless USB adapter that is physically connected to the computer system 100. Once the WiFi manager process 600 detects the WiFi hardware component 900, the WiFi present result will be generated to represent whether the WiFi hardware component 900 has been found in the computer system 100.

Step S130A includes initiating a UEFI WiFi driver corresponding to the WiFi hardware component 900 based on the WiFi present result. In the present embodiment, the WiFi manager process 600 may install or implement the WiFi driver 700 to drive the WiFi hardware component 900. A WiFi setup user interface 610 may be executed or utilized to call UEFI supplicant protocol services to assist in the implementation of the WiFi driver 700.

Step S140A includes determining, by the WiFi manager process 600 via the WiFi hardware component 900 through the WiFi driver 700, if the WiFi hardware component 900 is connected to the WiFi device 400. In the present embodiment, the WiFi manager process 600 will try to determine if the hardware component 900 is signally communicating wirelessly with the WiFi device 400. The WiFi manager process 600 will, via a standard WiFi Handler unit 630, try to establish a mutual agreement in communication protocols with the wireless device 400 by trying to figure out which communication protocol the wireless device 400 supports or is compliant with.

Step S150A includes generating the pairing connection data based on the connection information between the WiFi hardware component 900 and the WiFi device 400. In the present embodiment, the standard WiFi handler unit 630 will gather all the information pertaining to pairing with the wireless device 400 and generate a corresponding pairing connection data. The pairing connection data can include connection information such as the MAC address, SSID, manufacturer OEM ID of the wireless device 400. In the present embodiment, the pairing connection data is generated as an Advanced Configuration and Power Interface (ACPI) table, as exemplarily illustrated in FIG. 5C. This ACPI table is then stored in the UEFI network stack 500 in memory to be shared with processes in the Operating System environment.

Step S160A includes retrieving the ACPI table from the memory via the Operating System 202 under the Operating System environment after the UEFI firmware has handed control off to the Operating System 202. In the present embodiment, a WiFi manager process 600 (or a different WiFi manager process from the one implemented and executed by the UEFI firmware during the pre-OS environment) will initiate the Operating System 202 to drive the WiFi hardware component 900. As exemplarily illustrated in FIG. 4A, the WiFi manager process 600 will scan for and detect the WiFi hardware component 900, wherein the WiFi manager process 600 may then call the services of the WiFi setup user interface 610 to assist in implementing or installing the Operating System 202. The specific WiFi Handler unit 620 may then retrieve the pairing connection data from the UEFI network stack 500 in the memory and extract the connection information corresponding to the WiFi device 400 from the pairing connection data. In other words, in the present embodiment, the specific WiFi handler unit 620 can retrieve the ACPI table from the memory and utilize any or all of the connection information in the ACPI table to set up the parameters of operation of the Operating System 202.

Step S170A includes initiating connection to the WiFi device with the Operating System 202 based on the connection information in the ACPI table. In the present embodiment, after retrieving the connection information in the ACPI table of the pairing connection data, the WiFi hardware component 900 can be driven by the Operating System 202 to automatically connect and pair with the wireless device 400 using the extracted connection information. In this manner, when transitioning from the UEFI pre-OS environment to the Operating System environment, the wireless device 400 can be seamlessly used with the computer system 100 since the pairing connection information of the wireless device 400 is shared between the UEFI firmware and the Operating System.

Figure 6A:
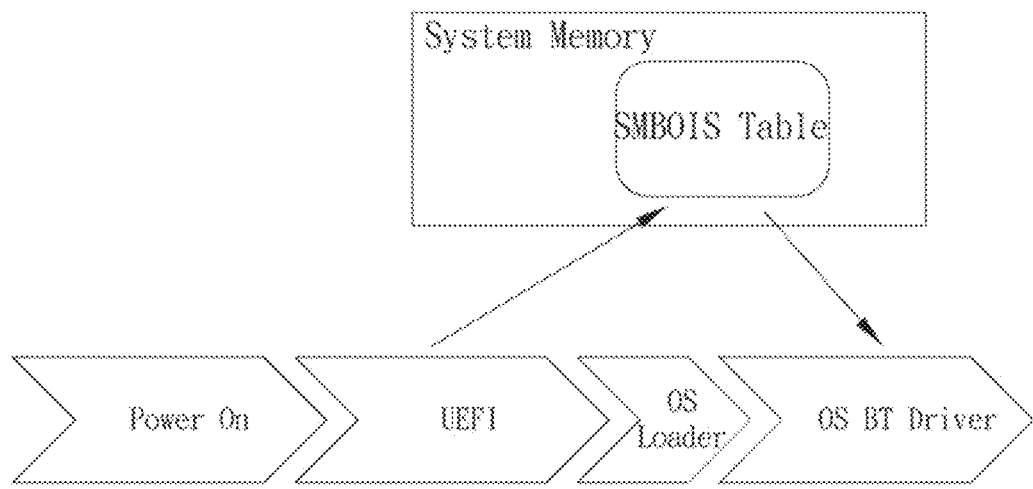
FIG. 6A is an embodiment of storing pairing connection data in the form of a SMBIOS Table.
Figure 6B:
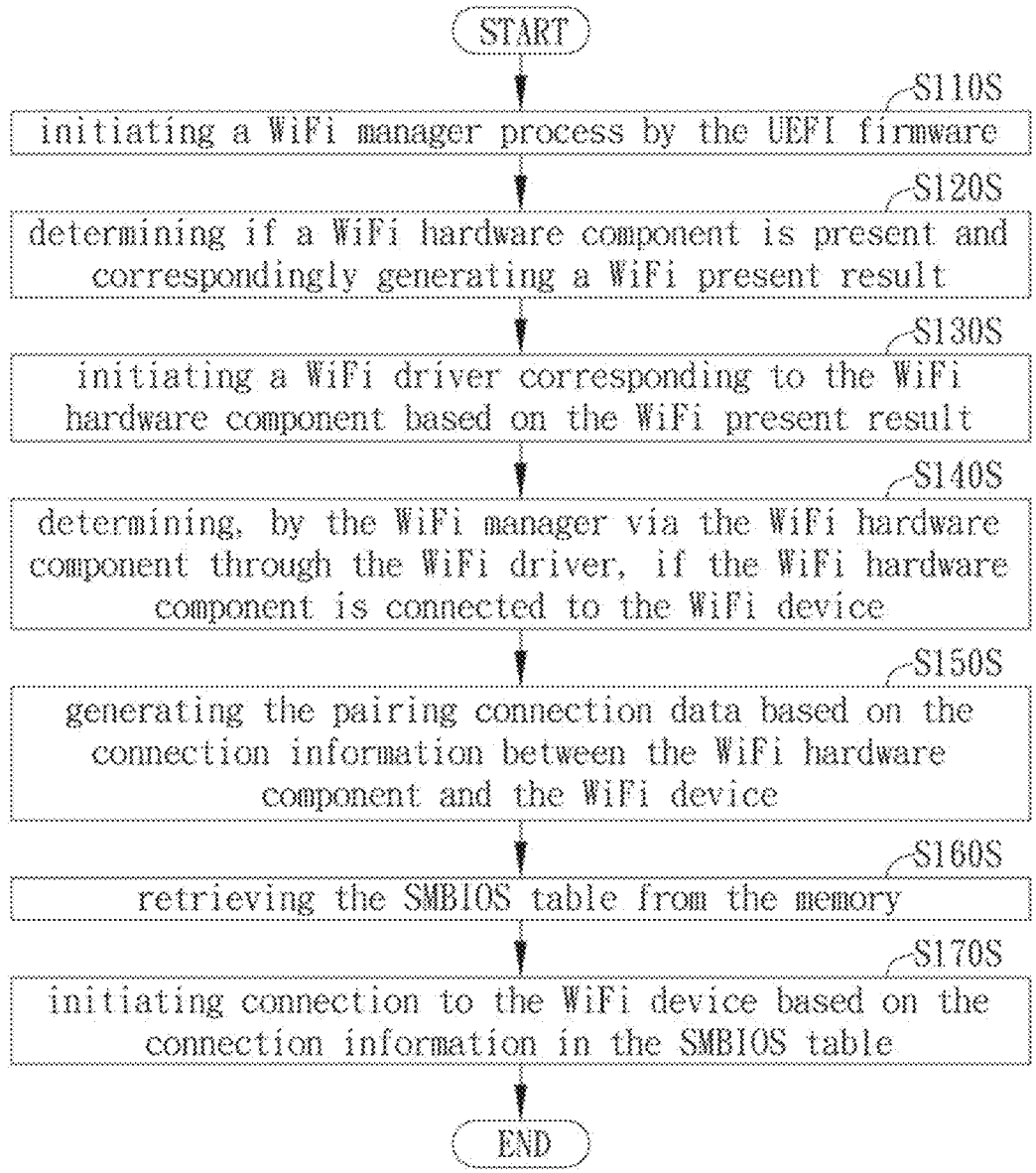
FIG. 6B is an embodiment of the method of sharing SMBIOS table of FIG. 6A.

FIG. 6A is another embodiment of FIG. 5B, wherein the pairing connection data is stored in memory as a SMBIOS (System Management BIOS) table. FIG. 6B is a flowchart of the method of sharing the pairing connection data of the SMBIOS table when transitioning from the UEFI pre-OS environment to the Operating System environment.

In the present embodiment, as illustrated in FIG. 6B, the method includes Steps S1105 to S170S, wherein these steps are quite similar to the Steps S110A to S170S mentioned above. In the steps pertaining to encoding the connection information of the wireless device 400 into the ACPI table of the previous method in FIG. 5B, the method of FIG. 6B encodes the connection information into the SMBIOS table. As an example of the SMBIOS table that can be generated, FIG. 6C illustrates an exemplary embodiment of the connection information being encoded into the SMBIOS table format to represent the pairing connection data that is to be stored in memory. The steps of encoding and retrieving of the pairing connection data is similar to the steps S110A to S170A, and therefore the explanations for S1105 to S170S should refer to the explanations given above for steps S110A to S170A but with reference to the ACPI table being replaced by the SMBIOS table. By encoding the pairing connection data in the SMBIOS data structure, the pairing connection information can be accessible by a wide variety of different operating systems, such as Microsoft Windows 10 and Linux based operating systems. In the same manner as the previous embodiment, after the pairing connection data is encoded in the SMBIOS table into the memory, the operating system 202 can access and retrieve the pairing connection data and automatically pair the wireless device 400 to the computer system 100 under the operating system environment.

Figure 7A:
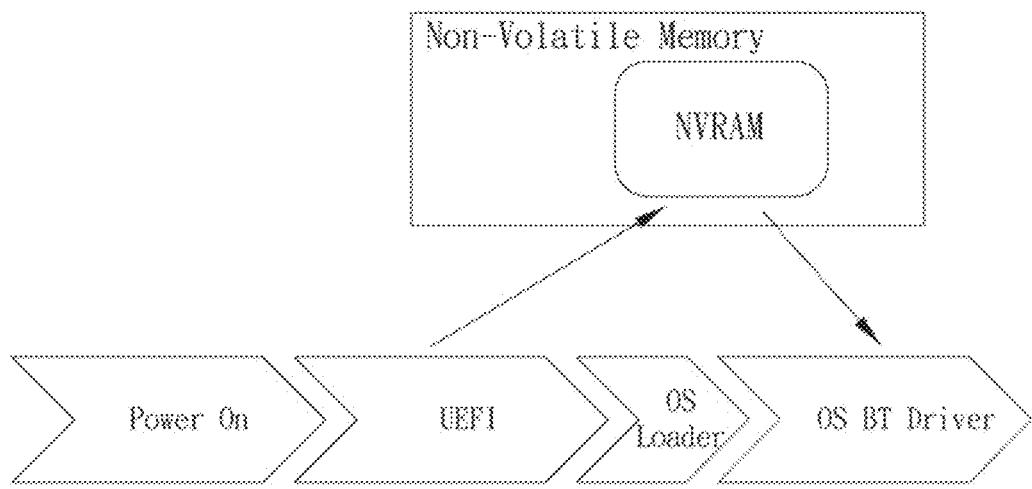
FIG. 7A is an embodiment of sharing pairing connection data in the form of an UEFI variable.
Figure 7B:
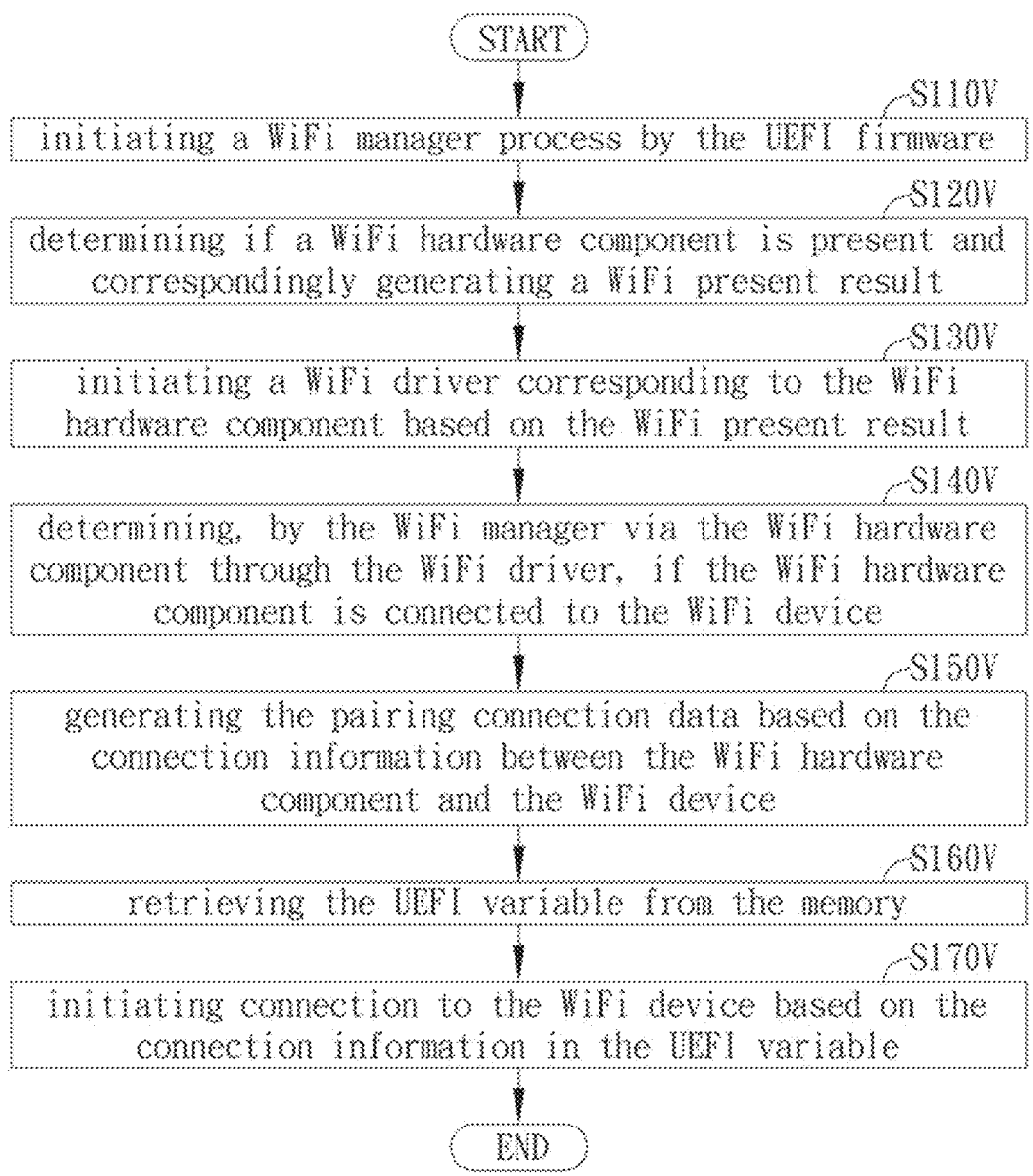
FIG. 7B is an embodiment of the method of sharing the UEFI variable of FIG. 7A.

FIG. 7A is another embodiment of FIGS. 5A and 6A, wherein the connection information of the wireless device 400 is encoded into the pairing connection data as a UEFI variable and stored in the non-volatile memory (NVRAM). FIG. 7B outlines the corresponding Steps S110V to S170V of Steps S110A to S170A, wherein the encoding and retrieval of the UEFI variable replaces the encoding and retrieval of the ACPI table. As exemplarily shown in FIG. 7C, FIG. 7C is an embodiment of the UEFI variable. In the present embodiment, the name of the UEFI variable can be "AMI_WIFI_INFO" and the attribute type can be set for the UEFI variable. FIG. 7D illustrates another embodiment of the format in which the connection information of the wireless device 400 can be encoded into the UEFI variable. For instance, the memory address or memory offset of particular information such as SSID, Security Type, and Security Phrase may be indicated in the UEFI variable. Accordingly, once the UEFI firmware has encoded the connection information into the UEFI variable as the pairing connection data, the operating system 202 can access the UEFI variable from the NVRAM memory and retrieve the connection information of the wireless device 400 from the UEFI variable. In this manner, the wireless device 400 can be seamlessly used by the user even when the computer system 100 transitions from the pre-OS environment to the Operating System environment.

FIG. 7B is another embodiment of the method of sharing wireless connection information when transitioning between the pre-OS environment to the Operating System environment. In the present embodiment, instead of encoding the pairing connection data as a ACPI table or SMBIOS table, the pairing connection data can be encoded as an UEFI variable. In the present embodiment, the pairing connection data is encoded and stored in memory as one or more UEFI variable. The advantage to this format is that both the UEFI firmware and the operating system 202 are UEFI compliant, and therefore when the pairing connection data is stored as an UEFI variable, both the UEFI firmware and the operating system 202 are able to easily access and read the pairing connection data. The method of the present embodiment includes steps S110V to S170V, wherein steps S110V to S150V are similar to steps S110A to S150A and therefore will not be further explained in detail. Step S160V includes retrieving the UEFI variable from the memory. This step is accomplished in the Operating System environment to retrieve wireless connection information corresponding to the wireless device 400 in the UEFI variable. Step S170V includes initiating connection to the WiFi device based on the connection information in the UEFI variable. After retrieving the wireless connection information from the UEFI variable, the WiFi manager 600 will have access to all the connection information corresponding to the wireless device 400 and can subsequently set these parameters into the Operating System 202 and drive the WiFi hardware component 900 to automatically pair with the wireless device 400.

Figure 8A:
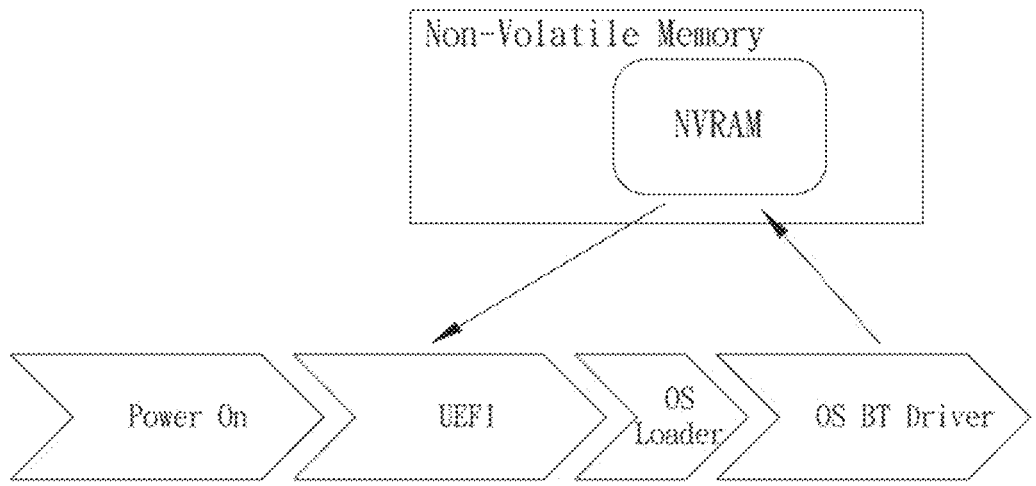
FIG. 8A is an embodiment of sharing the UEFI variable in the opposite direction to FIG. 7A.

FIG. 8A is an embodiment of the bidirectional feature of using UEFI variables to encode the pairing connection data. As shown in FIG. 8A, the wireless connection to the wireless device 400 can be established first in the Operating System environment, wherein this pairing connection information can then be encoded into one or more UEFI variables and stored in memory. Once the computer system 100 is reset or rebooted out of the Operating System environment and into the UEFI pre-OS environment, the UEFI firmware can retrieve the UEFI variable from the memory and extract the pairing connection data. The UEFI firmware can then drive the UEFI WiFi driver to drive the WiFi hardware component 900 to automatically pair with the wireless device 400 using the connection information derived from the UEFI variable.

Figure 8B:
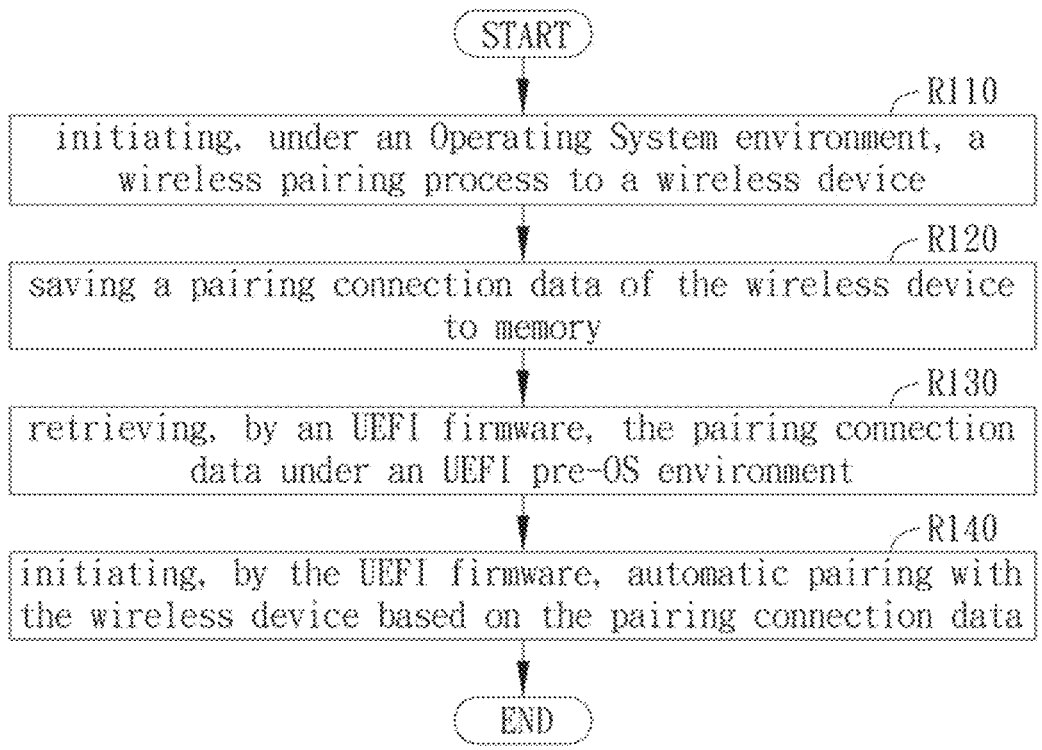
FIG. 8B is an embodiment of the method of sharing the UEFI variable of FIG. 8A.

FIG. 8B is an embodiment of the flowchart of sharing wireless connection information when transitioning from the Operating System environment to the pre-OS environment of FIG. 8A. As illustrated in FIG. 8B, the method includes steps R110 to R140.

Step R110 includes initiating, under an Operating System environment, a wireless pairing process to a wireless device. In the present embodiment, it is possible that the wireless device 400 is first paired to the computer system 100 when the computer system 100 is operating under the Operating System environment. In other words, control of the computer system 100 has already been handed to the Operating System 202 when the computer system 100 first initiates pairing procedures with the wireless device 400.

Step R120 includes saving a pairing connection data of the wireless device to memory. In the present embodiment, the pairing connection data refers to the wireless connection information associated with the successful pairing between the computer system 100 and the wireless device 400.

Step R130 includes retrieving, by an UEFI firmware, the pairing connection data under an UEFI pre-OS environment.

In the present embodiment, after step R120 of saving the pairing connection data to memory, the computer system 100 is rebooted out of the Operating System environment and into the pre-OS environment. In this case, the UEFI firmware will be executed in the pre-OS environment. The UEFI firmware will retrieve from the UEFI variable(s) from the memory and extract the wireless connection information from the pairing connection data of the UEFI variable(s).

Step R140 includes initiating, by the UEFI firmware, automatic pairing with the wireless device based on the pairing connection data. In the present embodiment, after extracting the wireless connection information from the pairing connection data of the UEFI variable(s), the UEFI firmware will drive the WiFi hardware component 900 through the WiFi driver 700 via the standard WiFi Handler unit 630 to automatically wirelessly pair with the wireless device 400.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A computer implemented method comprising:
    initiating power on mode in order to execute UEFI firmware for OS boot up procedure;
    initiating pairing with a wireless device;
    saving a pairing connection data of the wireless device to memory;
    retrieving the pairing connection data under Operating System environment; and
    initiating automatic pairing with the wireless device based on the pairing connection data;
    wherein the wireless device is a WiFi device, the method further comprising:
        initiating a WiFi manager process by the UEFI firmware; and
        determining if a WiFi hardware component is present and correspondingly generating a WiFi present result.

2. The method of claim 1, further comprising:
    initiating a UEFI WiFi driver corresponding to the WiFi hardware component; and
    determining, by the WiFi manager process via the WiFi hardware component through the UEFI WiFi driver, if the WiFi device is connected to the WiFi hardware component; and
    generating the pairing connection data based on a connection information between the WiFi hardware component and the WiFi device.

3. The method of claim 1, further comprising:
    generating an ACPI table as the pairing connection data; and
    saving the ACPI table to memory.

4. The method of claim 3, wherein the wireless device is a WiFi device, the method further comprising:
    building the ACPI table via a UEFI WiFi driver by transforming a connection information of the WiFi device into the ACPI table.

5. The method of claim 4, further comprising:
    retrieving the ACPI table from the memory via a OS WiFi driver under the Operating System environment; and
    initiating connection to the WiFi device with the OS WiFi driver based on the connection information in the ACPI table.

6. The method of claim 1, further comprising:
generating an SMBIOS table as the pairing connection data; and
saving the SMBIOS table to memory.

7. The method of claim 6, wherein the wireless device is a WiFi device, the method further comprising:
building the SMBIOS table via a UEFI WiFi driver by transforming a connection information of the WiFi device into the SMBIOS table.

8. The method of claim 7, further comprising:
retrieving the SMBIOS table from the memory via a OS WiFi driver under the Operating System environment; and
initiating connection to the WiFi device with the OS WiFi driver based on the connection information in the SMBIOS table.

9. The method of claim 1, wherein the wireless device is a WiFi device, the method further comprising:
generating a UEFI variable as the pairing connection data; and
saving the UEFI variable to memory.

10. The method of claim 9, further comprising:
creating the UEFI variable via a UEFI WiFi driver by transforming a connection information between the WiFi device and the UEFI WiFi driver into the UEFI variable.

11. The method of claim 10, further comprising:
retrieving the UEFI variable from the memory via a OS WiFi driver under the Operating System environment; and
initiating a connection to the WiFi device with the OS WiFi driver based on the connection information in the UEFI variable.

12. A computer implemented method comprising:
initiating, under an Operating System environment, a wireless pairing process to a wireless device;
saving a pairing connection data of the wireless device to memory;
retrieving, by an UEFI firmware, the pairing connection data under an UEFI pre-OS (pre Operating System) environment; and
initiating, by the UEFI firmware, automatic pairing with the wireless device based on the pairing connection data;
wherein the wireless device is a WiFi device, the method further comprising:
initiating an OS WiFi driver corresponding to a WiFi hardware component; and
initiating the wireless pairing process to the WiFi device via the WiFi hardware component through the OS WiFi driver.

13. The method of claim 12, further comprising:
generating an UEFI variable as the pairing connection data; and
saving the UEFI variable table to memory.

14. The method of claim 13, wherein the wireless device is a WiFi device, the method further comprising:
generating the UEFI variable via a OS WiFi driver by transforming a connection information of the WiFi device into the UEFI variable.

15. The method of claim 14, further comprising:
retrieving the UEFI variable from the memory via a UEFI WiFi driver under the UEFI pre-OS (pre Operating System) environment; and
initiating connection to the WiFi device with the UEFI WiFi driver based on the connection information in the UEFI variable.

16. A Computer System comprising:
a memory; and
computer-readable instructions stored at the memory and executable by a microprocessor to:
initiating power on mode in order to execute UEFI firmware for OS boot up procedure;
initiating pairing with a wireless device;
saving a pairing connection data of the wireless device to memory;
retrieving the pairing connection data under Operating System environment; and
initiating automatic pairing with the wireless device based on the pairing connection data;
wherein the instructions are further to:
generating an ACPI table as the pairing connection data by building the ACPI table via a UEFI WiFi driver and transforming a connection information of the wireless device into the ACPI table;
saving the ACPI table to memory;
retrieving the ACPI table from the memory via a OS WiFi driver under the Operating System environment; and
initiating connection to the WiFi device with the OS WiFi driver based on the connection information in the ACPI table.

17. The computer system of claim 16, wherein the instructions are further to:
generating a SMBIOS table as the pairing connection data by building the SMBIOS table via a UEFI WiFi driver and transforming a connection information of the wireless device into the SMBIOS table;
saving the SMBIOS table to memory;
retrieving the SMBIOS table from the memory via a OS WiFi driver under the Operating System environment; and
initiating connection to the WiFi device with the OS WiFi driver based on the connection information in the SMBIOS table.

18. The computer system of claim 16, wherein the instructions are further to:
generating a UEFI variable as the pairing connection data by building the UEFI variable via a UEFI WiFi driver and transforming a connection information of the wireless device into the UEFI variable;
saving the UEFI variable to memory;
retrieving the UEFI variable from the memory via a OS WiFi driver under the Operating System environment; and
initiating connection to the WiFi device with the OS WiFi driver based on the connection information in the UEFI variable.

19. A Computer System comprising:
a memory; and
computer-readable instructions stored at the memory and executable by a microprocessor to:
initiating, under an Operating System environment, a wireless pairing process to a wireless device;
saving a pairing connection data of the wireless device to memory;
retrieving, by an UEFI firmware, the pairing connection data under an UEFI pre-OS (pre Operating System) environment; and
initiating, by the UEFI firmware, automatic pairing with the wireless device based on the pairing connection data;

wherein the instructions are further to:

generating a UEFI variable as the pairing connection data by building the UEFI variable via a OS WiFi driver and transforming a connection information of the WiFi device into the UEFI variable;

saving the UEFI variable to memory;

retrieving the UEFI variable from the memory via a UEFI WiFi driver under the UEFI pre-OS (pre Operating System) environment; and initiating connection to the WiFi device with the UEFI WiFi driver based on the connection information in the UEFI variable.

* * * * *